US007733619B2

(12) United States Patent
Lee

(10) Patent No.: US 7,733,619 B2
(45) Date of Patent: Jun. 8, 2010

(54) OVERCURRENT BREAKING CONTROLLER FOR LAMPS AND LANTERNS

(75) Inventor: Hsien-Meng Lee, No. 82-1, Chaoguei 1st St., Situn District, Taichung (TW)

(73) Assignees: Air Cool Industrial Co., Ltd., Taichung (TW); Hsien-Meng Lee, Taichung (TW)

( * ) Notice: Subject to any disclaimer, the term of this patent is extended or adjusted under 35 U.S.C. 154(b) by 233 days.

(21) Appl. No.: 12/139,573

(22) Filed: Jun. 16, 2008

(65) Prior Publication Data

US 2009/0310271 A1 Dec. 17, 2009

(51) Int. Cl.
*H02H 3/08* (2006.01)

(52) U.S. Cl. .................................... 361/93.9; 361/93.7

(58) Field of Classification Search ....... 361/93.7–93.9; 315/138, 206, 216, 291

See application file for complete search history.

(56) References Cited

U.S. PATENT DOCUMENTS 5,455,491 A * 10/1995 Hajagos et al. ............. 315/291
6,262,565 B1 * 7/2001 Williams et al. ............ 323/237

* cited by examiner

*Primary Examiner*—Danny Nguyen
(74) *Attorney, Agent, or Firm*—Ming Chow; Sinorica, LLC

(57) ABSTRACT

An overcurrent breaking controller for a lamp and lantern is connected in series between AC power and a load and mainly comprises a current transformer connected to the AC power, an overcurrent restraint unit connected to the other terminal of current transformer, and a trigger control unit connected to the overcurrent restraint unit. The overcurrent restraint unit further comprises a phase delay unit and a time setting unit and thus may flicker or cut the power to give a warning signal to a user for achievement of energy conservation and for prevention of energy waste.

6 Claims, 5 Drawing Sheets

OVERCURRENT BREAKING CONTROLLER FOR LAMPS AND LANTERNS

BACKGROUND OF THE INVENTION

1. Field of the Invention

This invention relates to an improved overcurrent breaking controller for a lamp and lantern.

2. Description of the Prior Art

With reference to FIG. 1, an overcurrent breaking controller for a lamp and lantern 1, one terminal of which is coupled to AC power 2 and the other terminal is coupled to a lamp and lantern 3, comprises a current transformer 11, a trigger control unit 12, and an overcurrent restraint unit 13. The current transformer 11 is connected to the AC power 2. One terminal of the trigger control unit 12 is connected to the load 3. The overcurrent restraint unit 13 is connected between the trigger control unit 12 and the current transformer 11. When the lamp and lantern 3 becomes bright and a current generated from its power consumption exceeds a rated current, the current transformer 11 induces a high voltage and thus the current restraint unit 13 drives the trigger control unit 12 to interrupt supplied power for protection, and disconnection of the lamp and lantern 3 from the AC power is made, thereby the circuit of lamp and lantern 3 stays open. When the load current generated due to the power consumption of lamp and lantern drops and stays lower than the rating, the trigger control unit restarts to make the lamp and lantern 3 become bright again.

Consequently, because of the technical defects of described above, the applicant keeps on carving unflaggingly through wholehearted experience and research to develop the present invention, which can effectively improve the defects described above.

SUMMARY OF THE INVENTION

An improved overcurrent breaking controller for a lamp and lantern according to this invention is connected in series between AC power and a load and mainly comprises a current transformer provided with a primary coil wrapped with small number of coils, and with a secondary coil wrapped with large number of coils that may induce current and generate an induced voltage, an overcurrent restraint unit provided with a half wave rectifier voltage division circuit, a voltage regulator circuit, a Silicon-Controlled Rectifier (SCR), and a bridge rectifier, and a trigger control unit provided with a Diode for Alternating Current (DIAC) and a TRIode for Alternating Current (TRIAC). The overcurrent restraint unit further comprises a phase delay unit and a time setting unit. The phase delay unit comprises a rectification diode, a resistor, and a reference voltage capacitor. The time setting unit comprises a voltage-doubling rectification circuit, a voltage regulator circuit, a SCR, and a time control circuit. One terminal of the current voltage is connected to the AC power, while the other terminal is connected to the overcurrent restraint unit. One terminal of the phase delay unit is connected to the half wave rectifier voltage division circuit, while the other terminal is connected to Anode of SCR of the overcurrent restraint unit. One terminal of the time setting unit is connected to Anode of SCR of the overcurrent restraint unit, while the other terminal is connected to the bridge rectifier. One terminal of the trigger control unit is connected to the bridge rectifier, while the other terminal is connected to the load. The improved overcurrent breaking controller for the lamp and lantern may flicker or cut the power to give a warning signal to a user. If the lamp and lantern is damaged, the replaced lamp and lantern may be checked for an excessive rating current or power rating, and no extra power supply is required, thereby power saving and easy installation being achieved and even energy waste being prevented.

DETAILED DESCRIPTION OF THE PREFERRED EMBODIMENTS

The present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
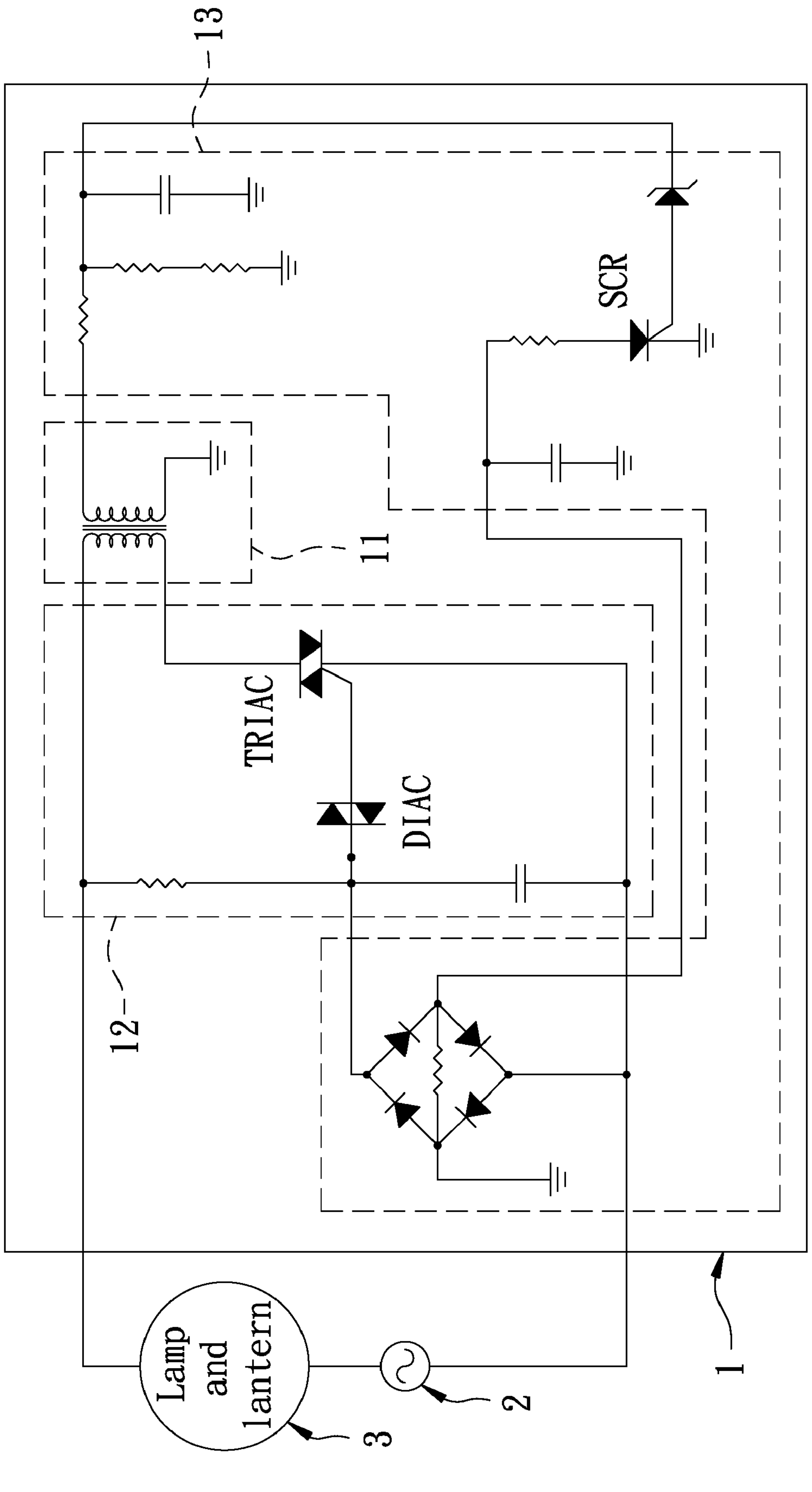
FIG. 1 PRIOR ART
FIG. 1 is a view of a conventional power protection circuit.
Figure 2:
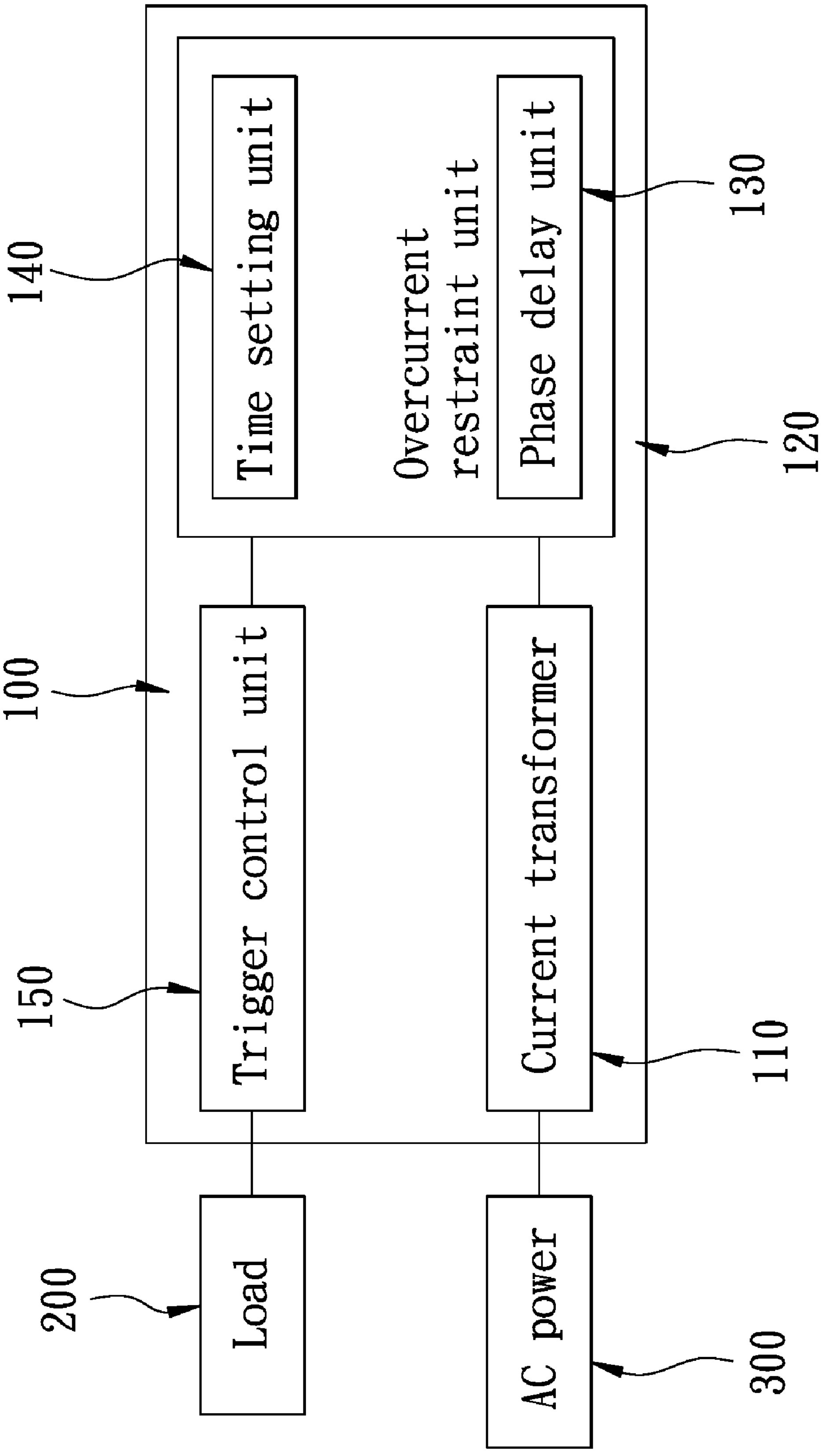
FIG. 2 is a block diagram of a circuit according to this invention.
Figure 3:
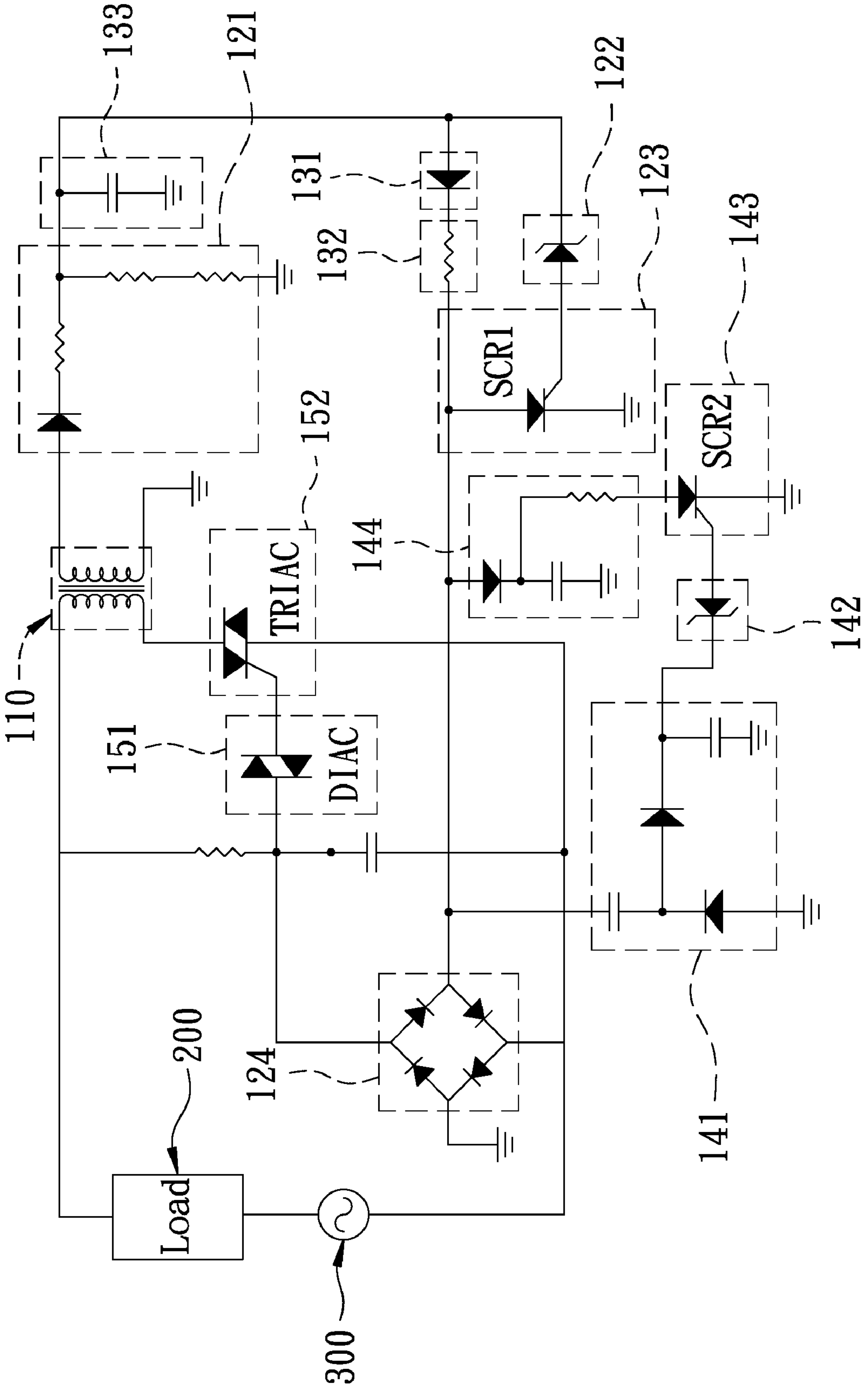
FIG. 3 is a circuit diagram according to this invention.

With reference to FIGS. 2 and 3 respectively illustrating a circuit block diagram and a circuit diagram according to this invention, one terminal of the overcurrent breaking controller for the lamp and lantern 100 is connected in series to a load 200, while the other terminal is connected to AC power 300 to control the load 200. The load 200 in the preferred embodiment of this invention is the lamp and lantern, mainly comprising a current transformer 110, a trigger control unit 150, and an overcurrent restraint unit 120.

The current transformer 110 one terminal of which is connected to the AC power mainly comprises a primary coil with small number of coils, and a secondary coil with large number of coils. In the preferred embodiment of this invention, a ratio of the primary coil to the secondary coil is set to 1:150. Thus, when a current passing through the load 200 increases, an induced current generated by the primary coil of the current transformer 110 increases and the induced voltage generated by the secondary coil increases.

The overcurrent restraint unit 120 is connected to the other terminal of current transformer 110 and mainly comprises a half wave rectifier voltage division circuit 121, a voltage regulator circuit 122, a Silicon-Controlled Rectifier (SCR) 123, and a bridge rectifier 124. The overcurrent restraint unit 120 further comprises a phase delay unit 130 and a time setting unit 140. The phase delay unit 130 comprises a rectification diode 131, a resistor 132, and a reference voltage capacitor 133. One terminal of the time setting unit 140 is connected to Anode of SCR of the overcurrent restraint unit 120, while the other terminal is connected to the bridge rectifier 124. Then, the Anode terminal of the SCR 123 is connected to the bridge rectifier 124, while Gate terminal of the SCR 123 is connected to the half wave rectifier voltage division circuit 121 through the connected voltage regulator circuit 122. The other terminal of the half wave rectifier voltage division circuit 121 is connected to the secondary coil of current transformer 110. In the preferred embodiment, the voltage regulator circuit 122 is a Zener diode. The phase delay unit 130 is connected to the reference voltage capacitor 133 through the Anode terminal of rectification diode 131 in the half wave rectifier voltage division circuit 121. The other terminal of rectification diode 131 is connected to the Anode terminal of SCR 123 through the connected resistor 132.

When the induced voltage generated from the secondary coil of current transformer 110 is high, the voltage generated from the half wave rectifier voltage division circuit 121 is divided and the reference voltage capacitor 133 is charged. When the voltage of reference voltage capacitor 133 is higher than that of voltage regulator circuit 122, SCR 123 is made to turn ON and the reference voltage capacitor 133 is discharged to 0 voltage; meanwhile when the signal of AC power 300 varies with positive and negative, SCR 123 is made to turn ON or OFF and thus the load 200 is made to flicker.

Figure 4:
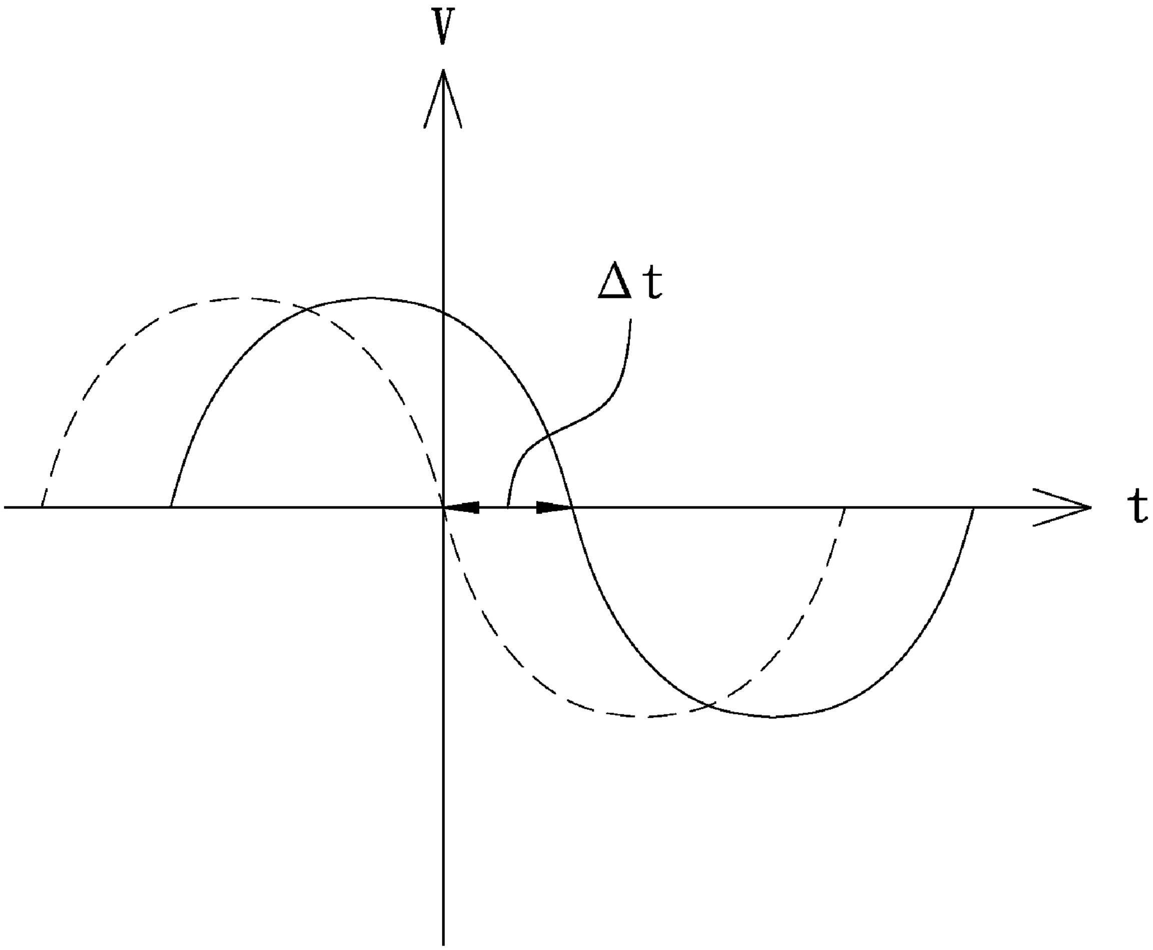
FIG. 4 is a view illustrating phase delay time of this invention.

With reference to FIG. 4, the phase delay unit 130 is connected to the reference voltage capacitor 133 through the Anode terminal of rectification diode 131 in the half wave rectifier voltage division circuit 121. The other terminal of rectification diode 131 is connected to the Anode terminal of SCR 123 through the connected resistor 132. Thus, when the rectification diode 131 turns ON, a time constant $\Delta t$ is gained from the resistor 132 and the reference voltage capacitor 133 to make a zero point delay when SCR 123 turns ON, and then the phase delay unit 130 is featured with time delay of zero point voltage to prolong the time when the lamp and lantern illuminates and extinguishes for achievement of flicker.

Figure 5:
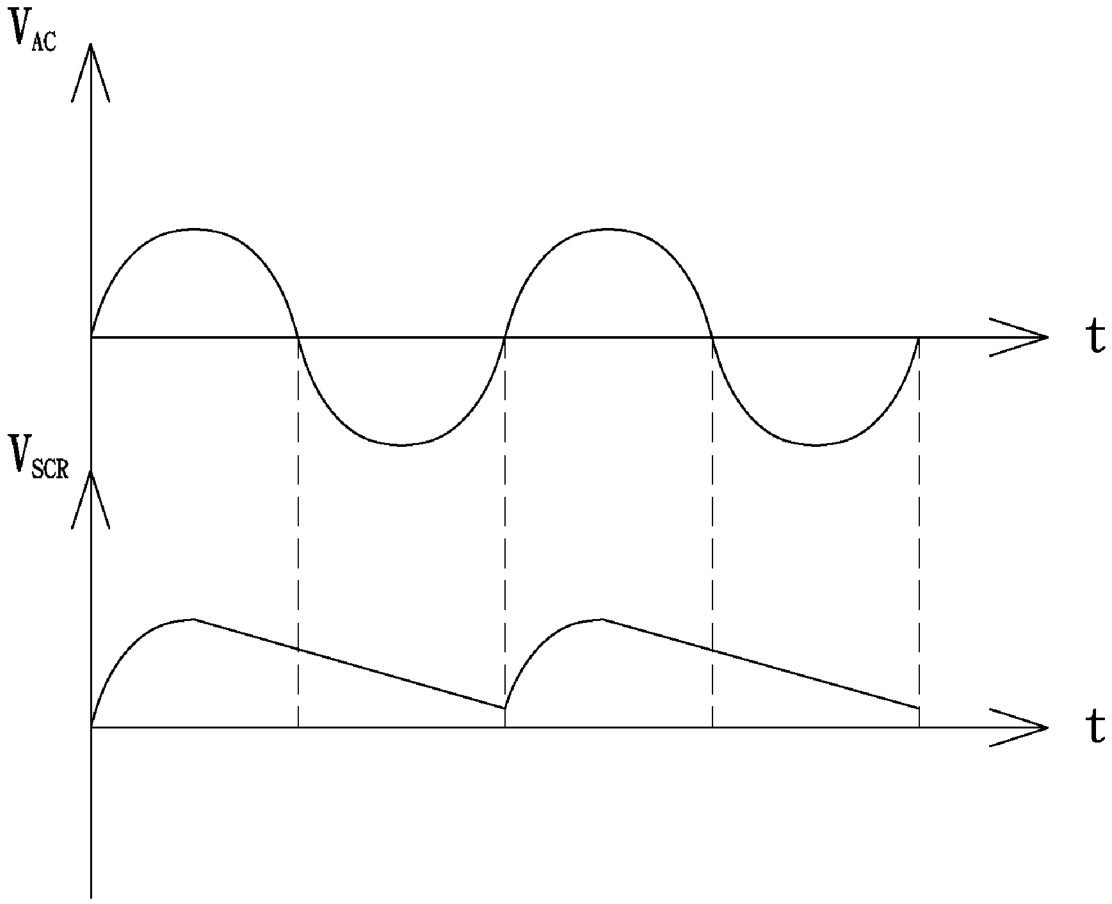
FIG. 5 is a view illustrating a waveform generated from a time control circuit according to this invention.

The time setting unit 140, one terminal of which is connected to Anode 123 of SCR of the overcurrent restraint unit 120 and the other terminal is connected to the bridge rectifier 124, comprises a voltage-doubling rectification circuit 141, a voltage regulator circuit 142, a SCR 143, and a time control circuit 144. One terminal of the voltage-doubling rectification circuit 141 is connected to the bridge rectifier 124, while the other terminal is connected to the voltage regulator circuit 142. The other terminal of voltage regulator circuit 142 is further connected in series to Gate of the SCR 143. The Anode terminal of SCR 143 is further connected to the time control circuit 144. In the preferred embodiment, a time constant is gained from a resistor 144*a*, a capacitor 144*b*, and a rectification diode 144*c* in the time control circuit 144. One terminal of the resistor 144*a* is connected to the Anode terminal of SCR 143, while the other terminal is connected to the capacitor 144*b* and the negative terminal of rectification diode 144*c*. The positive terminal of rectification diode 144*c* is further connected to the Anode terminal of SCR 123. With reference to FIG. 5 illustrating a waveform generated from a time control circuit according to this invention, when the SCR 143 turns ON, the AC power 300 operates for rectification and discharge through the resistor 144*a*, the capacitor 144*b*, and the rectification diode 144*c*. With the time constant higher than the periodic time of AC power 300, the voltage between Anode and Cathode of the SCR 143 is higher than zero; namely, the SCR 143 turns ON at all times, and the load 200 extinguishes and turns OFF until the overload current generated in the load 200 is lower than setting current. When the SCR 123 of the overcurrent restraint unit 120 starts to work, the load 200 flickers and generates a pulse, in which the pulse is amplified by the voltage-doubling rectification circuit 141 and then formed into a high voltage. When the voltage of voltage-doubling rectification circuit 141 is higher than that of voltage regulator circuit 142, the SCR 143 is triggered to turn ON, a ground loop being thereby formed in the time setting unit 140.

The trigger control unit 150, one terminal of which is connected to the other terminal of the bridge rectifier and the other terminal of which is connected to the load 200 to trigger and control the load 200, mainly comprises a Diode for Alternating Current (DIAC) 151 and a TRIode for Alternating Current (TRIAC) 152, in which the DIAC 151 is connected in series to Gate of the TRIAC 152 and the other terminal is connected to the bridge rectifier 124. Thus, the DIAC 151 that turns ON may trigger the TRIAC 152 so as to further control the load 200 to become bright. Contrarily, when a voltage drop is caused by a charging and discharging capacitor of the DIAC 151 connected to the bridge rectifier 124, the DIAC 151 is made to turn OFF and the load 200 is made to extinguish. When the SCR 123 of the overcurrent restraint unit 120 turns ON, a voltage drop is caused by the charging and discharging capacitor of the DIAC 151 connected to the bridge rectifier 124, the DIAC 151 is made to turn OFF and the TRIAC 152 is also made to turn OFF. At this time, the trigger control unit 150 does not send any triggering signal and thus the load 200 extinguishes. When the voltage of reference voltage capacitor 133 is lower than that of voltage regulator circuit 122 and the current between Anode and Cathode of the SCR is 0, the SCR 123 turns OFF; namely, the load 200 stays bright.

When the DIAC 151 of trigger control unit 150 triggers the TRIAC 152 turns it ON, the AC power 300 is supplied to the load 200 and the load 200 becomes bright. At this time, the induced current is generated in the primary coil of current transformer 110 and converted and amplified into an induced voltage in the secondary coil. The induced voltage is a high voltage. When the current generated during the power consumption of load 200 exceeds the setting current, the induced voltage generated from the secondary coil of current transformer 110 is rectified and divided by the half wave rectifier voltage division circuit 121 and charge the reference voltage capacitor 133. When the voltage of reference voltage capacitor 133 is higher than the setting voltage of voltage regulator circuit 122, the Zener diode in the voltage regulator circuit is made to turn ON and the Gate terminal of SCR 123 is triggered, the SCR 123 being thereby turning ON and the reference voltage capacitor 133 discharging to level 0. At this time, due to the SCR 123 turning ON, the bridge rectifier 124 also takes effect so as to make the voltage generated by the charging and discharging capacitor of the DIAC 151 connected to the other terminal of the rectifier 35 drop. When the voltage passing through the DIAC 151 is lower than its trigger voltage, in this invention, the trigger voltage is 30V. At this time, the DIAC 151 turns OFF, so the TRIAC 152 also turns OFF; thus, the circuit between the load 200 and the AC power 300 stays open and the load 200 is made to extinguish. At this time, the zero voltage time delay of the phase delay unit 130 delays the SCR 123 passing through the zero voltage; namely, it takes longer to turn ON the SCR 123 and extinguish the load 200. When the voltage of reference voltage capacitor 133 drops and stays lower than the setting voltage of voltage regulator circuit 122 and the current between Anode and Cathode of the SCR is 0, the SCR 123 turns OFF; namely, the load 200 stays bright. Because the voltage of reference voltage capacitor 133, relatively, it takes longer to trigger the SCR 123 again to turn ON. Thus, the load 200 flickers slowly in a cycle per second for visual effect, which becomes a warning function that is brought by the flickering lamp and lantern the current of which exceeds the rating current. A pulse is meanwhile generated during flickering. If the lamp and lantern continuously flicker, the pulse passes through the time setting unit 140 and charges the voltage-doubling rectification circuit 141 and gains a high voltage. When the voltage of voltage-doubling rectification circuit 141 is higher than the setting voltage of voltage regulator circuit 142, the voltage regulator circuit 142 turns ON and triggers the SCR 143 to turn ON, making the DIAC 151 connected to the bridge rectifier 124 turn OFF. The circuit between the load 200 and the AC power 300 stays open and the load 200 is made to extinguish. In the meantime, due to the time constant gained from the time control circuit 144 that is higher than the periodic time of AC power 300, the SCR 143 is made to turn ON at all times, further making the load 200 extinguish. When the current generated from the power consumption of the load 200 is lower than the rated current, the trigger control unit 150 re-trigger the load 200 and the load 200 becomes again bright. Thus, if the rated current is higher or the lamp and lantern the current or power of which is higher is installed, the improved overcurrent breaking controller for the lamp and lantern may flicker or cut the power to give a warning signal to a user for achievement of energy conservation and for prevention of energy waste.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An overcurrent breaking controller for a lamp and lantern, one terminal of which is connected in series to a load and the other terminal is connected to AC power, comprises:

a current transformer, one terminal of which is connected to the AC power, mainly comprising a primary coil with small number of coils, and a secondary coil with large number of coils, the primary coil being connected to the AC power;

an overcurrent restraint unit being connected to the other terminal of current transformer and mainly comprising a half wave rectifier voltage division circuit, a voltage regulator circuit, a Silicon-Controlled Rectifier (SCR), and a bridge rectifier, in which Anode of the SCR is connected to the bridge rectifier and further to a DIAC of the trigger control unit, a terminal of the DIAC that is connected to a charging and discharging capacitor is connected to the bridge rectifier, Gate of the SCR is connected to the half wave rectifier voltage division circuit through the connected voltage regulator circuit, and the other terminal of the half wave rectifier voltage division circuit is connected to the secondary coil of current transformer;

a phase delay unit, one terminal of which is connected to the half wave rectifier voltage division circuit and the other terminal of which is connected to the Anode terminal of SCR of the overcurrent restraint unit, in which when the SCR of the overcurrent restraint unit turns ON, the zero voltage generates a delay time constant $\Delta t$;

a time setting unit, one terminal of which is connected to Anode of the SCR of the overcurrent restraint unit and the other terminal of which is connected to the bridge rectifier, in which the SCR of the overcurrent restraint unit may be detected and then the time setting unit generates a ground loop after determined time to make a circuit between the load and the AC power stay open; and a trigger control unit, one terminal of which is connected to the overcurrent restraint unit and the other terminal of which is connected to the load, mainly comprising a DIAC and a TRIAC, in which one terminal of the DIAC is connected to the bridge rectifier and the other terminal is connected to Gate of the TRIAC the other terminal of which is connected to the load.

2. The overcurrent breaking controller for the lamp and lantern according to claim 1, wherein the phase delay unit comprises a rectification diode, a resistor, and a reference voltage capacitor, the positive terminal of rectification diode and the reference voltage capacitor are connected to the half wave rectifier voltage division circuit, and the other terminal of rectification diode is connected to the Anode terminal of SCR of the overcurrent restraint unit through the connected resistor.

3. The overcurrent breaking controller for the lamp and lantern according to claim 1, wherein the time setting unit comprises a voltage-doubling rectification circuit, a voltage regulator circuit, a SCR, and a time control circuit, one terminal of the voltage-doubling rectification circuit is connected to the bridge rectifier, and the other terminal is connected to the voltage regulator circuit the other terminal of which is connected to the SCR that is further connected to the time control unit the other terminal of which is further connected to the Anode terminal of SCR of the overcurrent restraint unit.

4. The overcurrent breaking controller for the lamp and lantern according to claim 3, wherein the time control circuit comprises a resistor, a capacitor, and a rectification diode, one terminal of the resistor is connected to the Anode terminal of SCR of the time setting unit, and the other terminal is connected to the capacitor and the negative terminal of rectification diode the positive terminal of which is further connected to the Anode terminal of SCR of the overcurrent restraint unit and oscillate with a time constant.

5. The overcurrent breaking controller for the lamp and lantern according to claim 2, wherein the time constant gained from the time control circuit must be higher than the periodic time of AC power.

6. The overcurrent breaking controller for the lamp and lantern according to claim 1, wherein the load is a lamp and lantern.

* * * * *